United States Patent
Youmans

[15] 3,666,122
[45] May 30, 1972

[54] MOVABLE LOAD SUPPORT FOR SELF LOADING VEHICLE

[72] Inventor: Donald W. Youmans, San Jose, Calif.
[73] Assignee: FMC Corporation, San Jose, Calif.
[22] Filed: Sept. 9, 1970
[21] Appl. No.: 70,738

[52] U.S. Cl. ............................214/77 R, 214/77 P, 214/518, 214/84, 214/DIG. 10
[51] Int. Cl. ............................................B60p 1/48
[58] Field of Search ...........................................214/77 P, 78

[56] References Cited

UNITED STATES PATENTS 2,683,539   7/1954   Corley, Jr. ..............................214/77 P

*Primary Examiner*—Philip Arnold
*Attorney*—F. W. Anderson, C. E. Tripp and J. W. Edwards

[57] ABSTRACT

A self-loading vehicle has a vertical swinging load support that includes a load engaging element of a fork type insertable under a pallet for loading the pallet onto the vehicle. Pivotally connected to the load engaging element is a link coupled to the vehicle by a linkage for swinging the link vertically and maintaining the link at a constant angular orientation with the horizontal during vertical swinging movement. A strut is pivotally connected to the link and engageable with a stop on the load engaging element for maintaining a horizontal position of the load engaging element during vertical swinging movement. The linkage includes an extensible link for pivoting the link connected to the load engaging element to a horizontal position which facilitates insertion of the load engaging element under a pallet with a minimum clearance.

6 Claims, 10 Drawing Figures

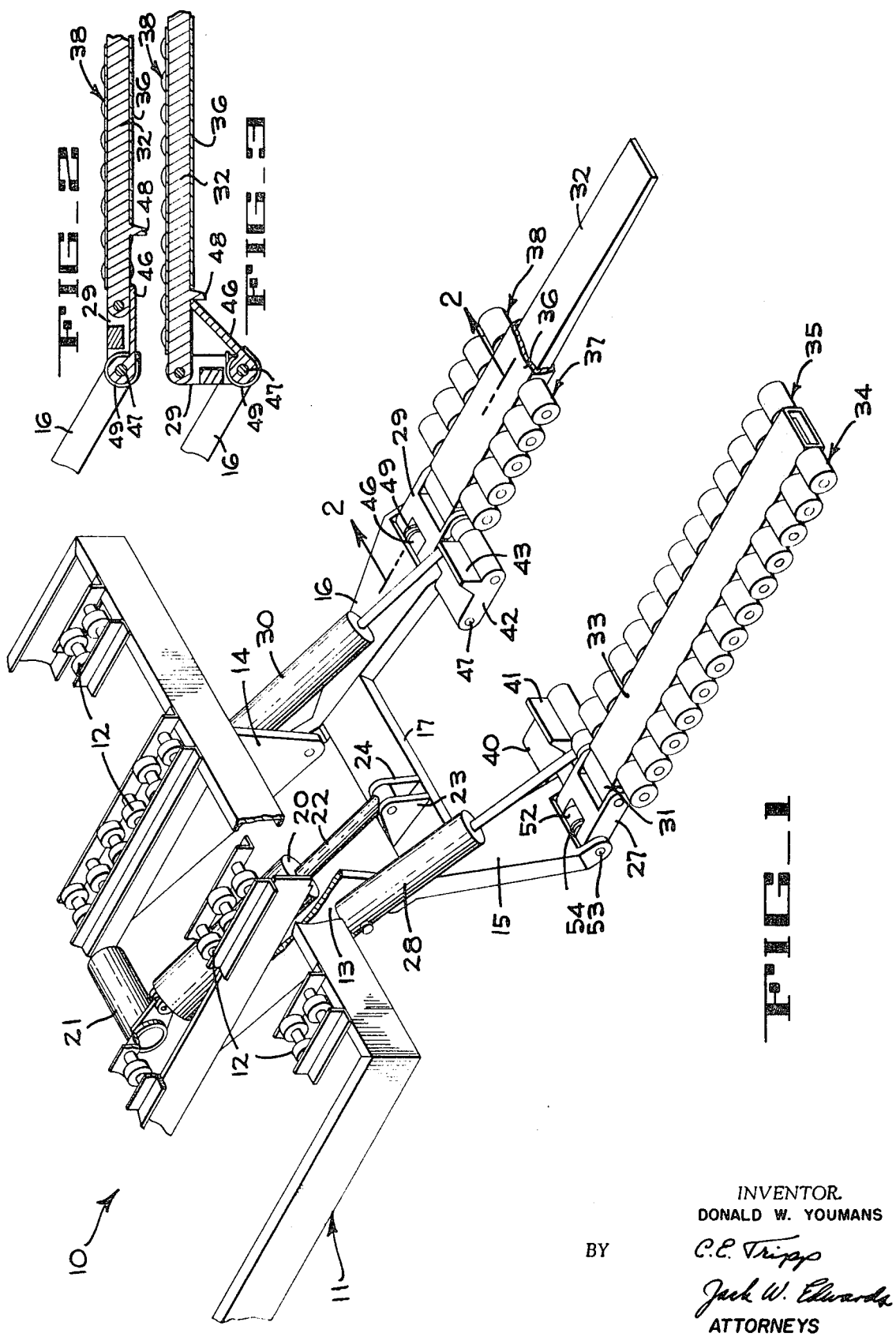

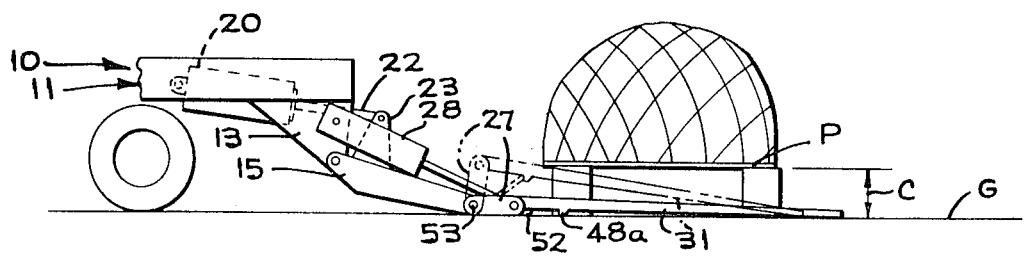
FIG_4
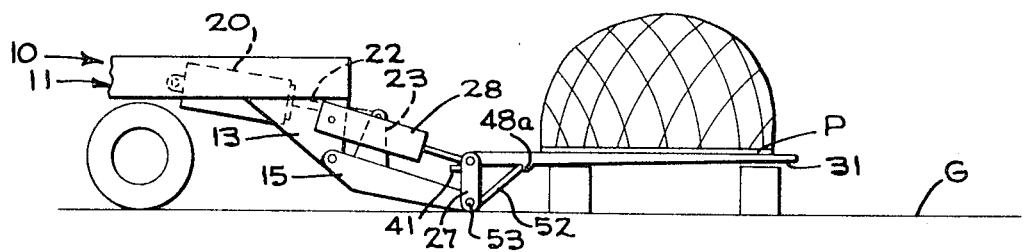
FIG_5
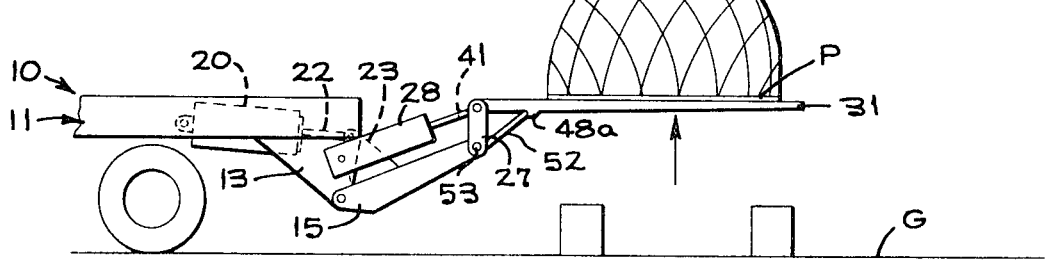
FIG_6
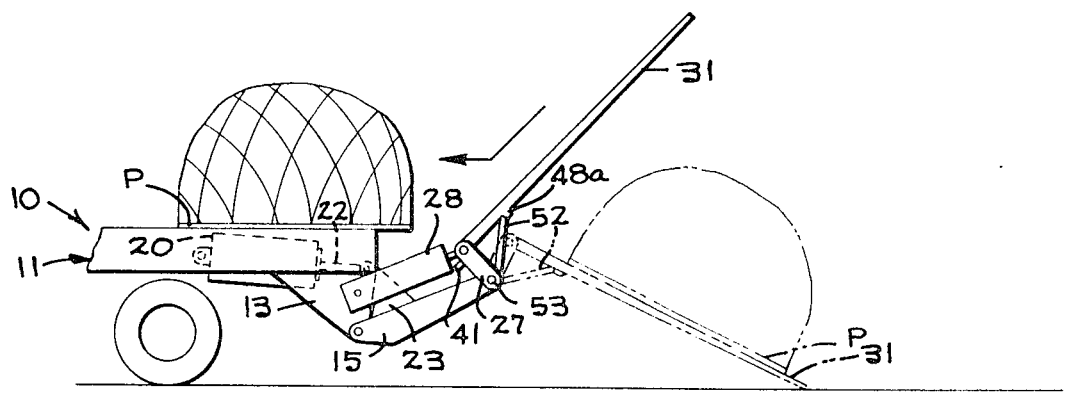
FIG_7

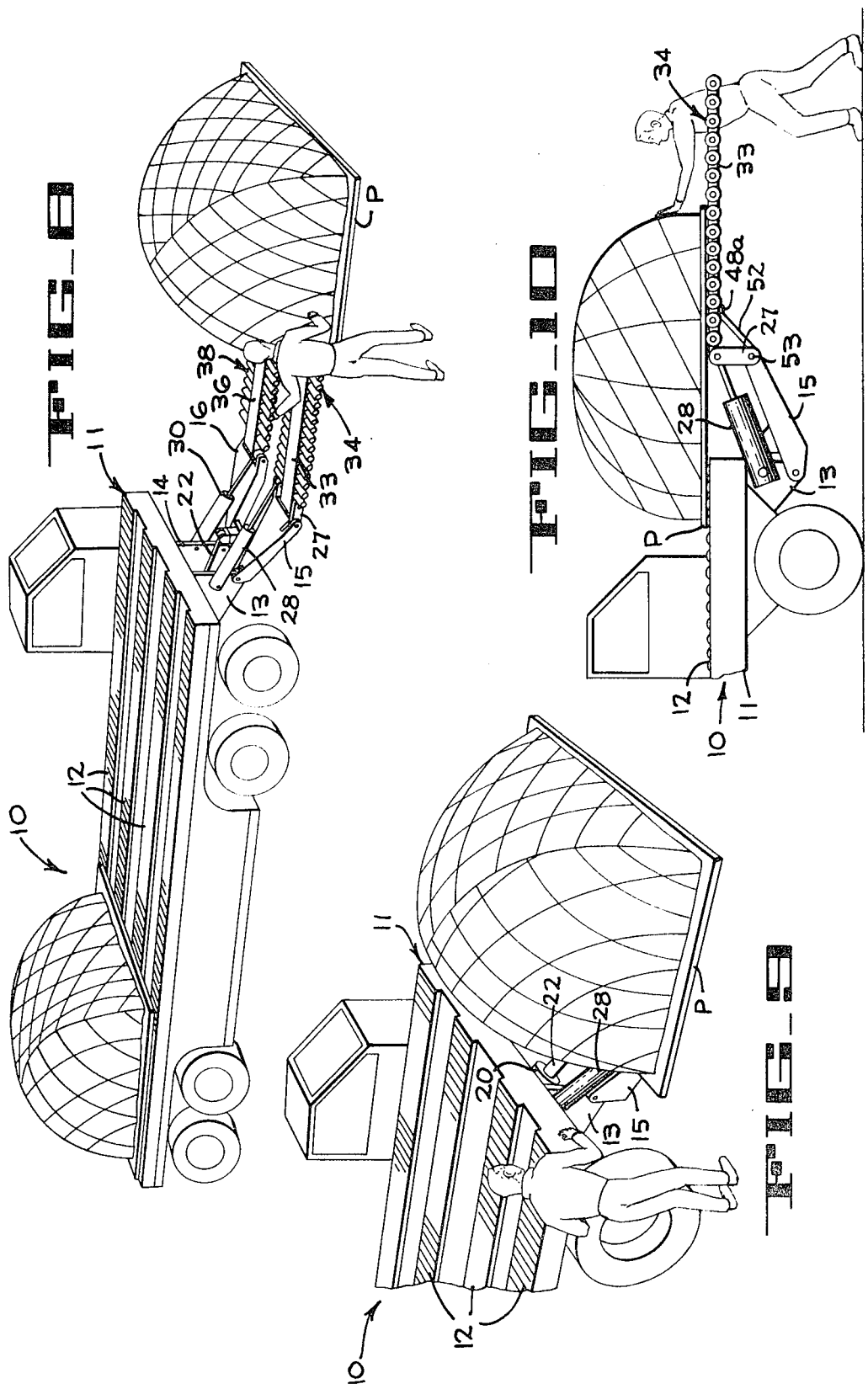

MOVABLE LOAD SUPPORT FOR SELF LOADING VEHICLE

BACKGROUND OF THE INVENTION

1. Field of the Invention

This invention relates to a self-loading vehicle and more particularly to a vertical swinging load support of a fork type that is insertable under a pallet for loading the pallet onto the vehicle.

2. Description of the Prior Art

Existing powered tailgate lift platforms utilize a four bar of parallelogram type linkage similar to the lifting linkage herein disclosed. When loading forks are substituted for the lift platform and the vehicle is used to position the forks under a pallet, a clearance problem is often encountered. A certain amount of spacing is required between opposite links of the lifting linkage but only a minimum clearance is available for inserting the load engaging elements under a pallet. Should the linkage project above the load engaging elements when these elements are elevated to the level of the vehicle load carrying surface, it would obstruct transferring a pallet from the load engaging elements to the vehicle.

SUMMARY OF THE INVENTION

Objects of the present invention are to provide a fork lift that can be inserted under a pallet with a minimum clearance, that can maintain the load engaging elements horizontal while lifting and that permits rolling a pallet onto a vehicle bed when the load engaging elements are raised to the level of the vehicle bed.

To solve the problem presented by the spacing requirement between opposite links of the lifting linkage and the minimum spacing available under a pallet, a link is hinged to the end portion of a loading engaging element. This link is connected in the lifting linkage together with an extensible link which maintains the link in a substantially vertical position when lifting the load engaging element. Extension of the extensible link pivots the link to a horizontal position for inserting the load engaging element under a pallet. A strut, pivotally connected to the link, underlies and is resiliently urged towards the load engaging element to engage a stop thereon for holding the load engaging element in a fixed position relative to the link. However, the strut disengages the stop and folds against the load engaging element when the link pivots to a horizontal position for inserting the load engaging element under a pallet.

BRIEF DESCRIPTION OF THE DRAWING

FIG. 1 is a perspective view of a fork lift embodying the present invention with portions broken away to show underlying structure.

FIG. 2 is an enlarged sectional view taken on the line 2—2 of FIG. 1 when the link is folded to a horizontal position for inserting the load engaging element under a pallet.

FIG. 3 is a sectional view taken as FIG. 2 but with the link folded to a substantially vertical position for elevating a pallet.

FIGS 4–7 are diagrammatic views illustrating the operation of the fork lift.

FIGS. 8–10 illustrate the operation of the fork lift in conjunction with a self loading vehicle.

DESCRIPTION OF THE PREFERRED EMBODIMENT

Looking first at FIG. 8, a self-loading transport vehicle 10 is shown for lifting pallets P from the ground, loading the pallets onto a vehicle bed, transporting the pallets to a destination, and unloading the pallets from the vehicle.

Now looking at FIG. 1, vehicle 10 has a frame 11 with roller conveyors 12 extending longitudinally thereof forming a bed for carrying loads such as pallets P. Triangular shaped mounting members 13 and 14 project downward from the frame in spaced relationship. An arm 15 is pivotally connected to mounting member 13 and an arm 16 is pivotally connected to mounting member 14. A brace 17 extends transversely between the arms locking them together for simultaneous pivotal movement.

Arms 15 and 16 are swung in a vertical arc by an actuator 20 pivotally connected at one end to a transverse member 21 of frame 11. An actuating arm 22 projects from the opposite end of the actuator and is pivotally coupled between a pair of mounting ears 23 and 24 that project upward from brace 17. When the actuating arm retracts within the actuator, arms 15 and 16 are elevated and when the actuating arm is extended, arms 16 and 16 are lowered.

An H-shaped link 27 is pivotally connected to the swinging end of arm 15 and an extensible link 28, in the form of an actuator, is pivotally connected between the link and mounting member 13. Seen more clearly in FIGS. 5 and 6, the vertical spacing between pivotal connections of arm 15 and extensible link 28 to mounting member 13 is the same as the vertical spacing between the arm and extensible link to link 27. The arm, link, extensible link, and mounting member form a four bar linkage which is a parallelogram when the extensible link equals the length of arm 15, and thus, link 27 can be swung vertically at a constant angular orientation with a horizontal.

In like manner, an H-shaped link 29, shown in FIG. 1, is pivotally connected to the swinging end of arm 16 and an extensible link 30 connects link 29 with mounting member 14. The arm, link, extensible link, and mounting member form a four bar linkage similar to the linkage previously described on the opposite side of brace 17.

A tine 31 is pivotally connected to link 27 and a rectangular sleeve 33 fits telescopically over the tine. The sleeve supports two parallel rows of rollers 34 and 35 which form a roller conveying surface. While the tine alone could be used as a load engaging element for insertion under a pallet, it is preferable to have the sleeve and rollers fitted thereon forming a roller conveying surface for transferring pallets therefrom to roller conveyors 12 on vehicle 10. Similarly, a tine 32 is pivotally connected to link 29 and a rectangular sleeve 36 fits telescopically over the tine. Two parallel rows of rollers 37 and 38 form a roller conveying surface thereon.

An attachment 40 mounted parallel with link 27 has a stop flange 41 projecting upward perpendicular thereto. When link 27 is in a horizontal position, the stop flange projects vertically to limit penetration of tine 31 beneath a pallet but when link 27 is in a vertical position, the stop flange projects horizontally below the roller conveying surface without obstructing transfer of a pallet between the load engaging element and roller conveyors 12. In like fashion, an attachment 42 mounted parallel with link 29 has a stop flange 43 projecting upward perpendicular thereto.

A strut 46 is pivotally mounted on a pin 47 that joins link 29 and attachment 42 with arm 16. As shown in FIG. 2, the strut underlies the link and tine 32 on which a stop 48 is provided. A torsion spring 49 is fitted about pin 47 and connects the strut with the link to resiliently urge the strut towards the tine. It should be noted that the bottom portion of rectangular sleeve 36 has been cut away behind stop 48 so that the strut can freely engage the bottom surface of the tine. When extensible link 30 retracts, pivoting link 29 to a vertical position as shown in FIG. 3, strut 46 engages stop 48. The strut, link and tine form a frame of right triangular shape by which the load engaging element is held in a horizontal position. In like manner, a strut 52 is pivotally mounted on pin 53 that connects link 27 and attachment 40 to arm 15. A torsion spring 54 resiliently urges strut 52 towards the bottom of tine 31 on which a stop 48a (FIGS. 4–7) is provided.

Operation of the load support is illustrated in FIGS. 4–7. Roller conveyors have been omitted in these Figures from tine 31 which acts directly as a load engaging element. As shown in FIG. 4, extensible link 28 can be extended, pivoting link 27 to a position in line with tine 31 so that both the link and tine lay flat on ground surface G to facilitate inserting the tine under a pallet P by moving vehicle 10 forward. Clearance C between the ground surface and pallet may vary but must be at least greater than the height of the tine when laying flat on the ground surface.

After tine 31 is inserted under a pallet P, extensible link 28 is retracted to lift the joint between link 27 and the tine. As this joint is raised as shown in phantom line in FIG. 4, strut 52 slides along the bottom surface of the tine until the strut engages stop 48a. When link 27 is vertical, as shown in FIG. 5, tine 31 extends horizontally therefrom and supports pallet P. Then actuating arm 22 can be retracted within actuator 20 causing arm 15 to elevate link 27 until tine 31 reaches the bed level of vehicle 10, as shown in FIG. 6. Pallet P can then be transferred to the vehicle bed by pushing it there from the tine. Pallets can be unloaded from the vehicle in the reverse manner.

FIG. 7 illustrates other uses of the load engaging element or tine 31. Further contraction of extensible link 28 tilts the tine upward as shown in solid line. A slight upward tilt of the tine can assist in transferring a pallet from the tine to the vehicle bed and when the loaded vehicle is travelling, the upward tilted tine serves as a stop to prevent a pallet P from sliding off. Upon reaching the destination of pallet P, extensible link 28 can be extended to tilt tine 31 downward forming a ramp as shown in phantom line for unloading the pallet.

FIGS. 8, 9 and 10 further illustrate operation of the self loading vehicle 10. The load engaging elements, including sleeves 33 and 36, are lowered to the ground surface and inserted under pallet P by movement of the vehicle. When properly positioned under the pallet, the load engaging elements are elevated to the level of roller conveyors 12 on the vehicle. Then a person assisting with the loading pushes the pallet from the load engaging elements onto the roller conveyors of the vehicle.

Although the best mode contemplated for carrying out the present invention has been herein shown and described, it will be apparent that modification and variation may be made without departing from what is regarded to be the subject mater of the invention.

What is claimed is:

1. A vertical swinging load support comprising a load engaging element, a link pivotally connected to one end of said load engaging element, a linkage for swinging said link and said load engaging element in a vertical plane and for maintaining the link at a constant angular relationship with the horizontal during vertical swinging movement of the load engaging element, said linkage including an extensible member for pivoting the the link from its position during vertical swinging movement of the load engaging element to a position in horizontal alignment with the load engaging element, a stop on the load engaging element, and a strut pivotally connected to the link for engagement with the stop to hold the load engaging element in a horizontal position during said vertical swinging movement, said strut being disengageable from the stop and foldable under the load engaging element and link when they are aligned horizontally to enable insertion of the load engaging element under a pallet having a minimum clearance.

2. A vertical swinging load support as described in claim 1, including means for resiliently urging the strut towards the load engaging element.

3. In a self-loading vehicle, a vertical swinging load support insertable under a pallet for loading the pallet onto said vehicle, said load support comprising an arm pivotally connected to said vehicle for vertical swinging movement; an actuator for moving said arm; a link pivotally connected to said arm; an extensible member pivotally connected to said vehicle and link for maintaining the link at a constant angular orientation with the horizontal during vertical swinging movement with the arm and being linearly extensible to tilt the link relative to the horizontal; a load engaging element pivotally connected to said link and having a stop thereon; and a strut pivotally connected to said link and underlying the load engaging element for engagement with the stop to hold the load engaging element in a horizontal position during vertical swinging movement; said link, load engaging element and strut forming a triangular frame which collapses for inserting the load engaging element under a pallet.

4. A vertical swinging load support as described in claim 3, wherein said link is maintained in a substantially vertical position during vertical swinging movement and said link, load engaging element and strut form a frame of right triangular shape.

5. A vertical swinging load support as described in claim 3, including an attachment mounted parallel with the link and a stop flange projecting upward perpendicular to the attachment for limiting horizontal penetration of the load engaging element under a pallet.

6. A vertical swinging load support as described in claim 3 wherein said load engaging element has a roller conveyor surface thereon.

* * * * *